US008021508B2

(12) United States Patent
Klemarewski

(10) Patent No.: US 8,021,508 B2
(45) Date of Patent: Sep. 20, 2011

(54) METHOD FOR PRODUCING WOOD FIBRE BOARDS

(75) Inventor: Andrzei Klemarewski, North Vancouver (CA)

(73) Assignee: Raute Oyj, Nastola (FI)

( * ) Notice: Subject to any disclaimer, the term of this patent is extended or adjusted under 35 U.S.C. 154(b) by 427 days.

(21) Appl. No.: 12/274,523

(22) Filed: Nov. 20, 2008

(65) Prior Publication Data

US 2009/0133816 A1 May 28, 2009

(30) Foreign Application Priority Data

Nov. 23, 2007 (FI) ...................................... 20070891

(51) Int. Cl.
*B29C 47/02* (2006.01)

(52) U.S. Cl. ......... 156/244.12; 156/244.22; 156/244.27; 264/108; 264/120

(58) Field of Classification Search ........................ None
See application file for complete search history.

(56) References Cited

U.S. PATENT DOCUMENTS

| | | | | |
|---|---|---|---|---|
| 2,335,308 | A | 11/1943 | Pendergrast et al. | |
| 2,960,423 | A * | 11/1960 | Kreibaum | 428/188 |
| 4,208,367 | A * | 6/1980 | Wunning | 264/43 |
| 5,139,723 | A | 8/1992 | Ehnert et al. | |

FOREIGN PATENT DOCUMENTS

| | | |
|---|---|---|
| GB | 789929 | 1/1958 |
| JP | 2002264108 | 9/2002 |
| WO | WO-9835811 | 8/1998 |

OTHER PUBLICATIONS

Berglund et al., "Wood Composites", Handbook of Wood Chemistry and Wood Composites, chapter 10, 2005, pp. 279-301.

* cited by examiner

*Primary Examiner* — Richard Crispino
*Assistant Examiner* — Barbara J. Musser
(74) *Attorney, Agent, or Firm* — Connolly Bove Lodge & Hutz LLP

(57) ABSTRACT

The present invention is directed to a method for manufacturing a panel containing wood fibers. The wood material is cut into strands having a thickness and a width perpendicular to the grain direction and a length parallel with the grain direction, the length being significantly greater with respect to the other dimensions. An adhesive is applied to the strands, the glued strands are formed into an assembly, wherein the strands are substantially parallel in the longitudinal direction, and the strands remaining substantially parallel in the longitudinal direction are extruded by applying a thrusting force substantially perpendicular with respect to the longitudinal direction of the strands.

10 Claims, 5 Drawing Sheets

METHOD FOR PRODUCING WOOD FIBRE BOARDS

Figure 1:
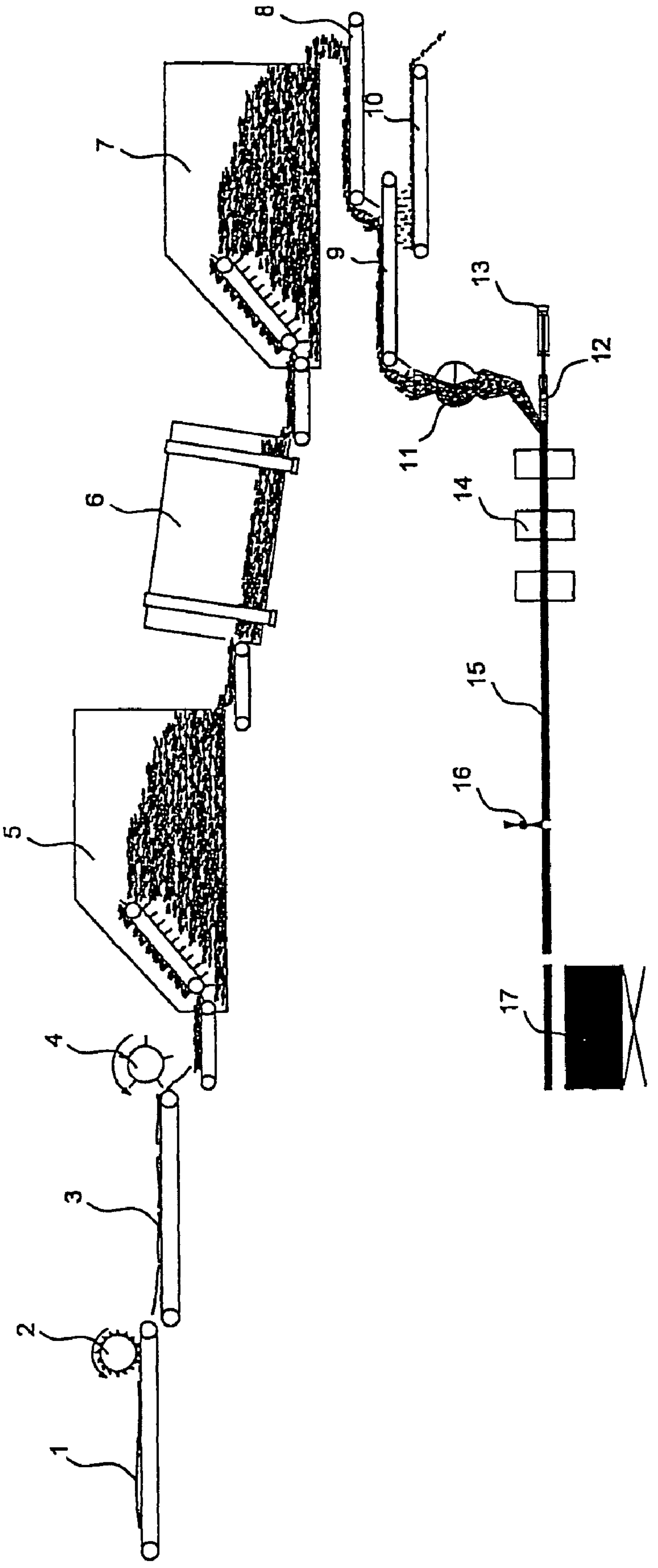

The present invention is directed to a method for manufacturing a panel containing wood fibers. The method allows utilizing wood material that with traditional manufacturing methods would not be used at all or would have restricted use. Suitable for use as raw material are waste fragments from plywood manufacturing, such as veneer peeling cores, fragments from trimming of veneer, log residuals from lumber manufacturing, and wood with small diameter in general. In the present context the term "wood" also includes other plants with similar fibrous properties, for example bamboo and other grasses containing fibers.

Traditionally, panels containing wood fibers have been manufactured in various ways from said raw materials, whereby various strips or strands (from hereon referred to as "strand") are made out of wood material or other similar material, then an adhesive is applied to the strands, the strands covered with the adhesive are pressed into end products of a desired shape and size, and the adhesive is cured. In different implementations the strands have different dimensions. As a common dimensional feature, these fragments are significantly longer in the grain direction than perpendicularly to the grain direction. The strands are manufactured using various methods, particularly by clipping from the wood material substantially on a plane in accordance with the grain direction.

Various methods are used in the glue application process, and generally the object is to subject the stands throughout to the adhesive. The strands covered with the adhesive are formed into an assembly, and the desired features of the manufactured product are sought to be accounted for when forming the assembly. The disposition of the strands in the assembly provides an essential means for affecting the features of the product, for example, assembling the strands with their grain directions in alignment.

The adhesives used are common thermosetting adhesives used in manufacturing of wood panels, such as phenol-formaldehyde resin. The heat required for the cure of the adhesive is generally conducted into the assembly during pressing, by convection heating through the press plates, or by radiation heating, for example heating with microwaves. The microwave heating is conducted during pressing or during the steps immediately after the pressing to the billet through parts of the machinery that are permeable to microwaves.

Periodically operating plate presses and continuously operating band presses have been used for pressing the assembly. Extrusion has also been used for making products out of wood strands or fibers handled with adhesive. With such extrusion methods, it has not been possible to maintain the eventually provided alignment of the strands or to effect their disposition so as to achieve the desired tensile strength properties in the extruded product. As is known in the art, in extrusion the pressing force is provided by a reciprocating extrusion piston. The extrusion piston is used to force the adhesive-covered strand into the extrusion die, through which the product passes. Examples of these methods and apparatuses used in respective implementations are described e.g. in EP Patent Publication No. 118079 and German Patent Application No. 25 39 674.

With the method in accordance with the present invention, panels containing wood fibers can be provided, wherein the strands of the panel are substantially oriented in a manner giving the panel particularly advantageous strength properties in a certain direction, said properties being relevant in certain applications.

The method is based on prior art, i.e. according to the method, the wood material is cut into strands having a width and a thickness substantially perpendicular with respect to the grain direction and a length parallel with the grain direction, the length being significantly greater than the other dimensions, an adhesive is applied to the strands, which are thereafter extruded, forming a preformed panel, and the adhesive is cured with heat while being subjected to extrusion. According to the characterizing features of the invention, the strands are formed into an assembly, wherein the various strands are substantially parallel lengthwise, and the strands remaining substantially parallel lengthwise are extruded by application of a thrusting force substantially perpendicular with respect to the longitudinal direction of the strands.

The method of the present invention will be described in more detail in the following, with reference to the appended drawing, wherein one apparatus for implementing the invention is presented schematically.

Figure 2:
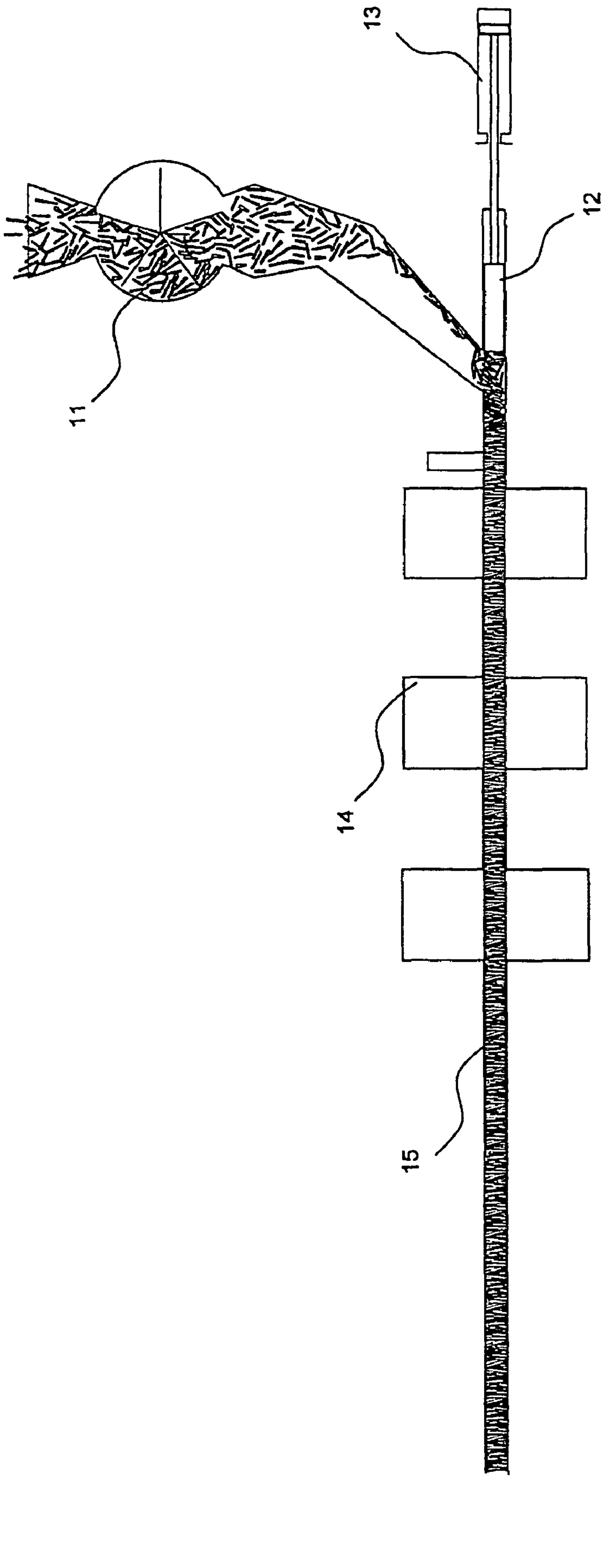
Figure 3:
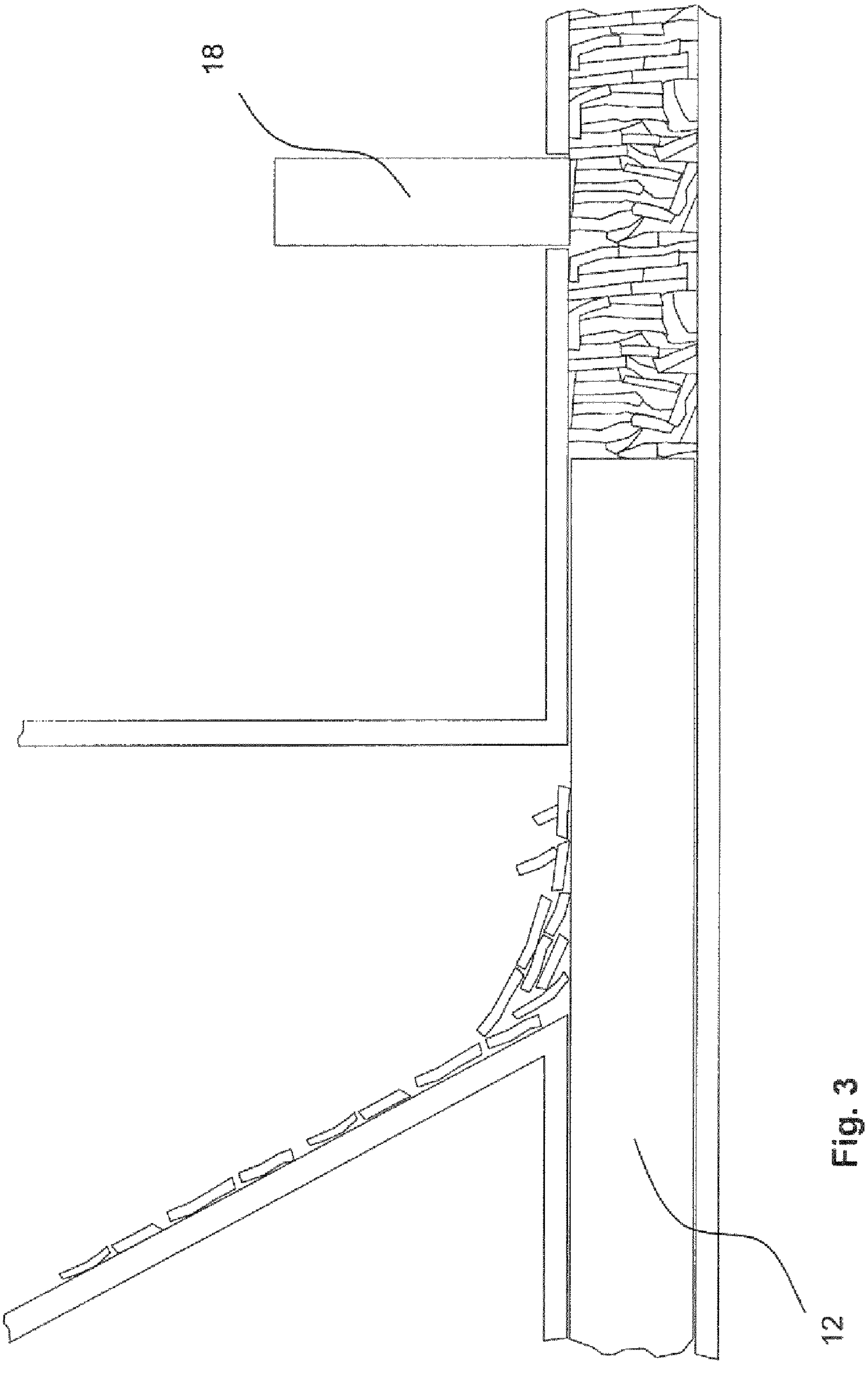
Figure 4:
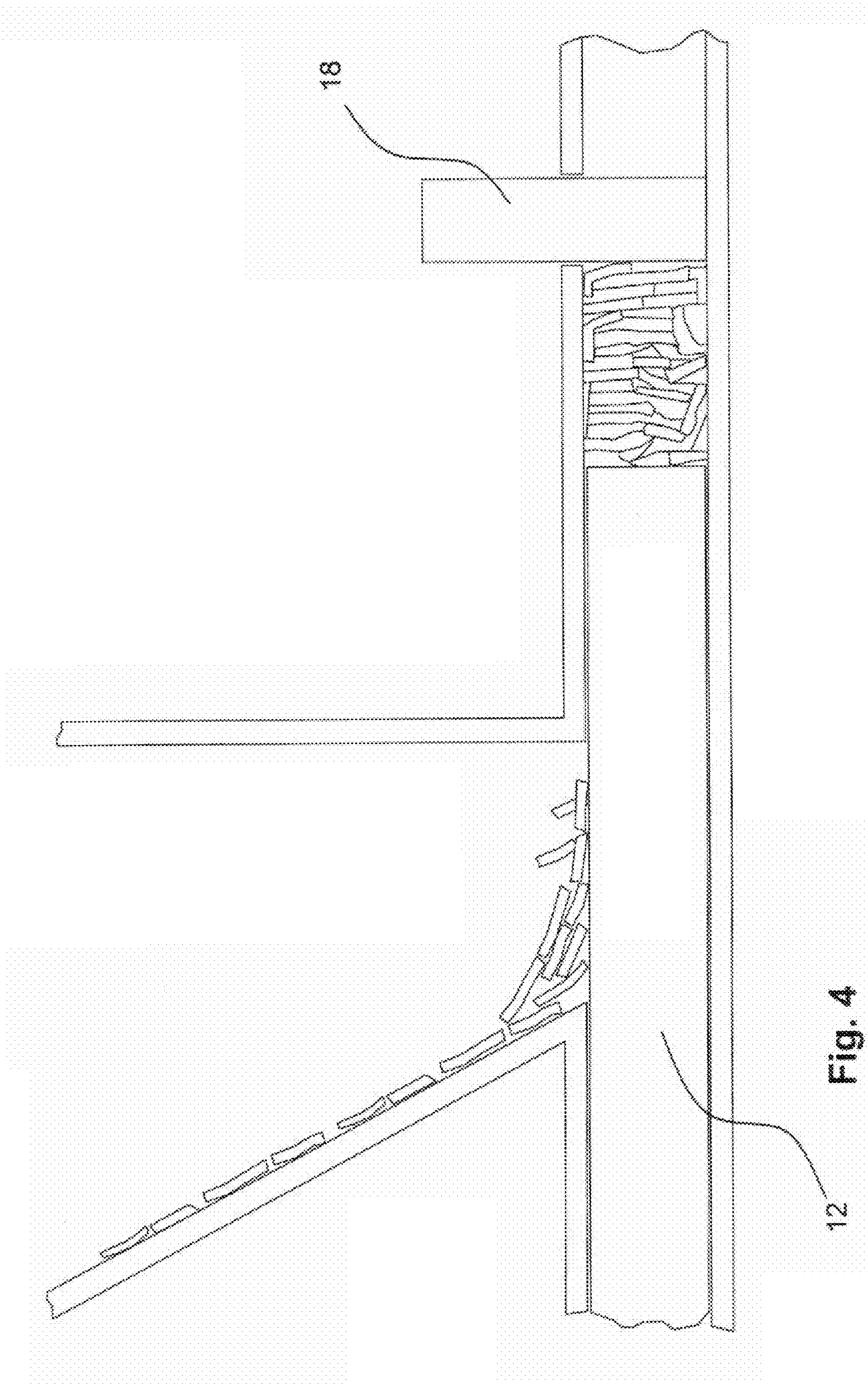
Figure 5:
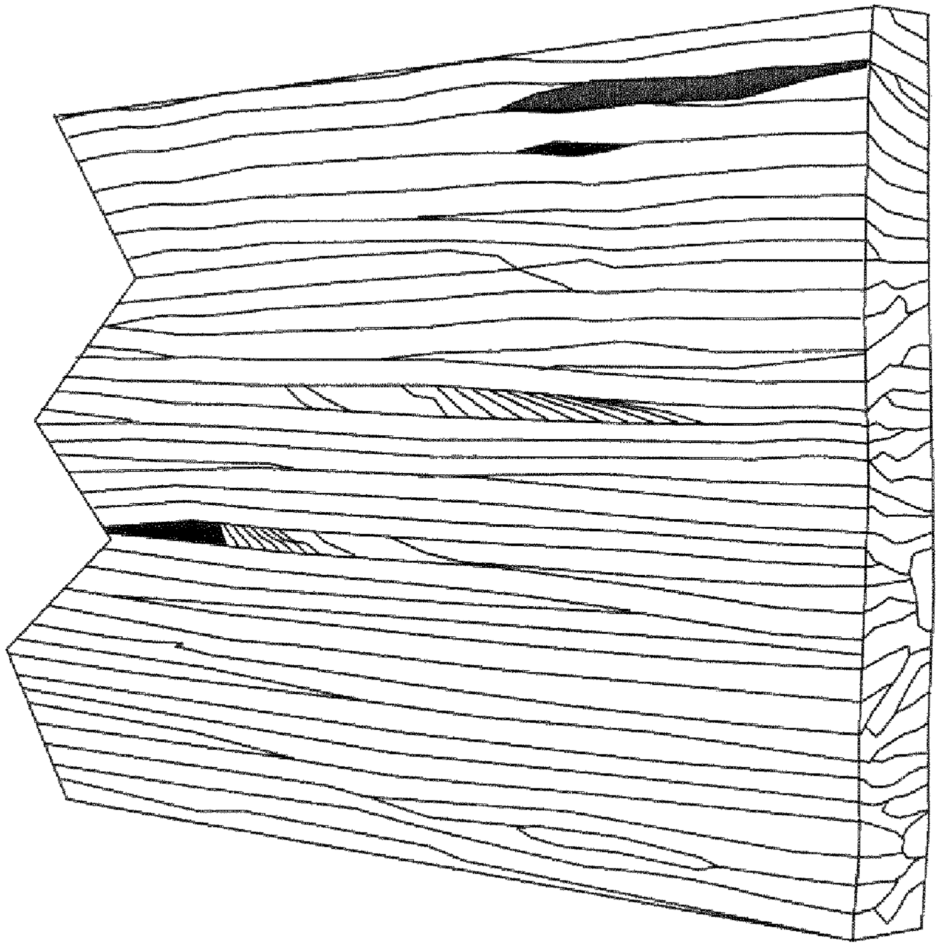

FIG. 1 shows a principal illustration of a comprehensive apparatus for implementing the method according to the present invention, as a principal layout, FIG. 2 shows a detail of the apparatus, illustrating an embodiment of a substantial part of the invention, FIG. 3 shows a detail of the operation of the substantial part of the apparatus of FIG. 2, FIG. 4 illustrates a phase of the operation of the apparatus of FIG. 3 in the beginning of the manufacturing process, and FIG. 5 is a schematic, cross-sectional view of the product manufactured in accordance with the method of the invention.

FIG. 1 shows a wood veneer 1 coming from a cutting apparatus having cut the veneer from a piece of wood, e.g. a veneer peeling core provided by a veneer lathe, or the wood veneer may be originated from trimming of a veneer sheet. The veneer may have a full-length and a random width (the length is the dimension parallel to the grain direction of the veneer, i.e. the length of the log where it has been cut from, and the width is the dimension perpendicular to the grain direction). For standardizing the length of the veneer, the apparatus may include one or more cross cut saws 2 for cutting the veneer to the length of e.g. 300 mm in the grain direction. Standardization of the dimension in the grain direction is not substantial in all cases. The need for standardization mostly depends on the dimensions of the machine parts downstream the processing line. Next in the apparatus, an essential tool 4 is provided for cutting strands of a desired width from the veneer by cutting parallel to the grain direction. The measure of thickness of the strands has been determined earlier within the device used to peel the veneer 1 in the veneer lathe. The measure of thickness may be a veneer thickness used in plywood manufacturing, on the order of 5 mm. The width of the veneer produced by the tool 4 may vary, ranging for example from 3.0 to 20 mm.

Depending on the origin and condition of the wood resources used for producing the strands, it may be necessary to dry the strands in a suitable drier, such as the drum drier 6. From here the strands are directed via intermediate storage 7 to an adhesive applying device like a compartment feeder 11 as illustrated, said feeder being provided with means for applying the adhesive and operating as a glue blender, after which the strands are further directed to the point for forming the assembly of the preformed panel.

When considering the orientation of the strands while going through the process, it should be noted that the strands coming from the cutter 4 enter the intermediate storage 5 substantially in an orientation having the grain direction of the strand, i.e. the longitudinal direction, perpendicular with respect to the direction of travel of the strands. The dryer 6 inevitably causes mixing of the strands, which disturbs the alignment of the strands. It is possible to provide some orientation for the stream of strands emerging from the dryer while moving them up to the intermediate storage 6, whereby the strands turn to a longitudinal orientation that is somewhat closer to perpendicular with respect to the direction of travel. However, the strands in the stream of strands entering the glue blender 11 are to a large extent disorganized with respect to the direction as well in length as in width and height. The state of their orientation changes as the strands are dropped to the feeding zone of the extrusion die, where the assembly that will be extruded is formed, as is shown in FIG. 3.

The strands are formed into an assembly in front of the feeding piston 12 of the extruder die, when the piston is in its retracted position. When a sufficient amount of strands have been set in the assembly, the assembly is pressed against a previous batch already in the die thereby compressing it. The front surface of the piston 12 substantially corresponds to the cross-sectional dimension of the extruder die. As the piston moves forwards following the assembling phase, if the strands have a cross-section with a greater width than thickness or similarly a greater thickness than width, the strands tend to settle in front of the piston in such a manner that more likely, the greater cross-sectional dimension ends up parallel to the direction of the front surface of the extrusion piston 12. The two greater dimensions of the strands in the preformed panel formed by extrusion more likely end up in two predominant orientations, the longitudinal dimension in grain direction in horizontal and the greater cross-sectional dimension turns to vertical. In order to achieve the desired orientation for the strands, the thrusting force providing the extrusion has to be substantially horizontal.

In the implementation of the apparatus according to FIG. 3, the counterpressure that is significant with respect to the orientation of the strands is formed by the advancement resistance of the material in the extrusion die, which can be increased by reducing the cross section of the die. Alternatively, a stopper 18 may be provided in the forepart of the extrusion die, the stopper being lowered down as the operation begins to provide advancement resistance. Later in the process the plugged material substitutes the stopper 18, which may be lifted.

An extruder die may be used in manufacturing plates according to the present invention, the passage of the die having, for example, a height ranging from 12 to 20 mm and a width ranging from 1250 to 2500 mm.

Following the extrusion phase or as a part of the extrusion phase, heat is conducted to the panel billet consisting of strands and adhesive, whereby the curing of the adhesive is accelerated. The heat my by conducted by convection through the walls of the extrusion die, or alternatively, by microwave heating. Multiple successive devices 14 used for microwave heating may be provided within the extrusion die to provide a sufficient heating effect. Microwave heaters as such are known in the art. Windows of an applicable material permeable to microwave radiation have to be provided in the extrusion die for the heaters.

Using the apparatus described hereinabove, the panels may be manufactured into finished panels, wherein the adhesive is cured under the pressure provided and maintained in the extrusion die. Alternatively, a regular preformed panel may be provided by extrusion which is directed into a heat press that is suitable for further processing, or is heated and directed to the final pressing phase. The heat press may be an ordinary plate press with heated press plates. The plate press may have a single mouth or multiple mouths. Continually operating band presses are also suitable. Conduction of heat energy by microwave heating or conventional convection heating may be incorporated in the band press.

As a consequence of the predefined orientation provided for the strands in manufacturing, the finished panel advantageously has strength properties against the forces that tend to load the panel in a direction perpendicular to the broad surface of the panel.

A panel manufactured by use of the method according to the present invention may be utilized, for example, as the core panel in laminated structures where the surface layer of the structure is formed by laminating the core panel. Various other wood based panels, such as plywood, may be used for laminating, depending on the end use of the panel. An exemplary application is the use as bottom plates of the cargo space of vehicles.

The invention claimed is:

1. A method for manufacturing a panel containing wood fibers, comprising cutting wood into strands having a thickness and a width perpendicular to the grain direction of the wood and a length parallel to the grain direction, the dimension of the width differing from the dimension of the thickness and the length being significantly greater with respect to the other dimensions and also to the thickness of the panel to be manufactured, applying an adhesive on the strands, forming an assembly of the strands wherein the strands are substantially mutually parallel in the longitudinal direction, then extrusion-pressing by a piston the strands substantially in said mutually parallel longitudinal direction state by applying a thrusting force perpendicular to the longitudinal direction of the strands, whereby the greater cross-sectional dimension of the strands will end up in a direction parallel to the plane of the front face of the used piston, and curing the adhesive.

2. The method according to claim 1, wherein the thrusting force is directed as a reciprocating action.

3. The method according to claim 1, wherein strands are used having dimensions ranging: thickness: from 0.5 to 0.8 mm; width: from 3.0 to 20 mm; length: from 200 to 2500 mm.

4. The method according to claim 1, wherein an extruder die is used having the following cross-sectional dimensions: (12 to 20 mm)×(1250 to 2500 mm), and the strands are passed into the extruder die with their grain direction substantially parallel to the greater dimension.

5. The method according to claim 1, wherein the thrusting load is applied to the strands substantially horizontally and maintained for the duration of the extrusion pressing.

6. The method according to claim 1, wherein advancement resistance is used in the beginning of the extrusion process.

7. The method according to claim 2, wherein advancement resistance is used in the beginning of the extrusion process.

8. The method according to claim 3, wherein advancement resistance is used in the beginning of the extrusion process.

9. The method according to claim 4, wherein advancement resistance is used in the beginning of the extrusion process.

10. The method according to claim 5, wherein advancement resistance is used in the beginning of the extrusion process.

* * * * *